United States Patent
Xia et al.

(10) Patent No.: US 10,527,345 B2
(45) Date of Patent: Jan. 7, 2020

(54) REFRIGERATOR

(71) Applicant: BSH HAUSGERAETE GMBH, Munich (DE)

(72) Inventors: Bicong Xia, Nanjing (CN); Chuan Zhang, Chuzhou (CN); Nanwei Zhang, Nanjing (CN)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 15/610,687

(22) Filed: Jun. 1, 2017

(65) Prior Publication Data

US 2017/0350644 A1 Dec. 7, 2017

(30) Foreign Application Priority Data

Jun. 3, 2016 (CN) .......................... 2016 1 0393767

(51) Int. Cl.
| | | |
|---|---|---|
| H04N 9/47 | (2006.01) | |
| H04N 7/18 | (2006.01) | |
| F25D 29/00 | (2006.01) | |
| F25D 23/02 | (2006.01) | |
| F25D 23/12 | (2006.01) | |
| H04N 5/225 | (2006.01) | |
| H04N 5/232 | (2006.01) | |

(52) U.S. Cl.
CPC .......... *F25D 29/005* (2013.01); *F25D 23/02* (2013.01); *F25D 23/028* (2013.01); *F25D 23/12* (2013.01); *H04N 5/2252* (2013.01); *H04N 5/23203* (2013.01); *H04N 7/183* (2013.01); *H04N 7/188* (2013.01); *F25D 2323/024* (2013.01); *F25D 2400/361* (2013.01); *F25D 2700/02* (2013.01); *H04N 5/2257* (2013.01)

(58) Field of Classification Search
None
See application file for complete search history.

(56) References Cited

U.S. PATENT DOCUMENTS

| | | | | |
|---|---|---|---|---|
| 2014/0293060 A1* | 10/2014 | Ryu | ..................... | H04N 5/2252 348/159 |
| 2014/0313328 A1* | 10/2014 | Park | ....................... | H04N 7/183 348/143 |
| 2014/0316799 A1* | 10/2014 | Cosgrove | ............ | G06F 19/3462 705/2 |
| 2017/0041520 A1* | 2/2017 | Carlotto | ............... | H04N 5/2252 |

* cited by examiner

*Primary Examiner* — Talha M Nawaz
(74) *Attorney, Agent, or Firm* — Laurence A. Greenberg; Werner H. Stemer; Ralph E. Locher

(57) ABSTRACT

A refrigerator includes a cabinet and a door connected to the cabinet. The door includes a door sheet body, a side cover connected to an end portion of the door sheet body and a controller fixed to the side cover. The side cover is provided with an installation hole which faces away from an opening at a side of the door sheet body, and a cover member configured to seal the opening. The controller is located in the installation hole. The controller is installed in the side cover, so as not to be damaged by being immersed in a foaming liquid, thereby enabling a simpler assembly process.

18 Claims, 7 Drawing Sheets

REFRIGERATOR

CROSS-REFERENCE TO RELATED APPLICATION

This application claims the priority, under 35 U.S.C. § 119, of Chinese Patent Application CN 2016 10393 767.4, filed Jun. 3, 2016; the prior application is herewith incorporated by reference in its entirety.

BACKGROUND OF THE INVENTION

Field of the Invention

The present invention relates to a refrigerator.

Description of the Related Art

A refrigerator is a necessary household appliance in modern home life. The refrigerator is provided with various controllers for controlling corresponding components. For example, a controller in a user interface unit which is connected to an input/output device, a wireless communication module controlling communications with external devices, and/or a controller for controlling a camera device.

With respect to the user interface unit, in a known device, a refrigerator door is provided with an open recess for accommodating the user interface unit. Further for example, the refrigerator door is provided with an accommodation groove for accommodating the user interface unit, where an opening of the accommodation groove is located at a lateral/longitudinal side surface of the refrigerator door, and the user interface unit is located at an operable/visible position which is in front of the door. The accommodation groove extends from a side surface of the refrigerator door towards a central area of the door. Therefore, an additional component is needed to form a housing separated from a foam layer of the refrigerator door. In addition, that increases the thickness of the refrigerator door and the complexity of a door structure.

In the prior art, when the refrigerator door is provided with the camera device, a control unit of the camera device is located on a cabinet, thus increasing wiring complexity.

SUMMARY OF THE INVENTION

It is accordingly an object of the invention to provide an advanced refrigerator, which overcomes or resolves at least one of the hereinafore-mentioned disadvantages of the heretofore-known refrigerators of this general type.

With the foregoing and other objects in view there is provided, in accordance with the invention, a refrigerator including a cabinet and a door connected to the cabinet. The door includes a door sheet body, a side cover connected to an end portion of the door sheet body and a controller fixed to the side cover. The side cover is provided with an installation hole and a cover member configured to close the installation hole. The controller is located in the installation hole.

As compared with the prior art, the technical construction of the present invention has the following advantages: first, the controller is installed in the side cover, so as not to be damaged by being immersed in a foaming liquid. Second, the controller is installed in the installation hole. Therefore, there is no need to provide an additional installation structure of the controller in the door sheet body or the cabinet, and a structure of the door sheet body or the cabinet may also be simplified. Third, when installing, the controller is first installed on the side cover, and then the side cover is connected to the door sheet body. In this way, the assembly process is made simpler.

It should be understood that the side cover may be an upper side cover, a lower side cover, a left side cover, or a right side cover, on the door.

Optionally, the controller is fixed to an inner side of the cover member.

Optionally, the inner side of the cover member is provided with a positioning portion through which the controller is fixed to the cover member.

Optionally, the cover member is plate-shaped, and the controller is plate-shaped and parallel to the cover member.

Optionally, the installation hole is a blind hole.

Optionally, along a front-back direction of the refrigerator, the installation hole is staggered from a storage chamber, so as to avoid an occurrence of a dewing phenomenon at a portion of the installation hole.

Optionally, a part of an outer surface of the door is formed at an outer side of the cover member.

Optionally, the refrigerator further includes a camera device fixed to the door, where the controller is electrically connected to the camera device; and the camera device is configured to receive a control instruction of the controller, and perform an image capturing action according to the control instruction.

Optionally, the camera device is provided with an output module, configured to output a captured image to the controller.

Optionally, the controller is provided with a wireless communication module which is configured to communicate with a remote server.

Optionally, the refrigerator further includes a sensor fixed to the door and configured to detect an opening degree of the door, where the sensor is electrically connected to the controller; and the controller is configured to generate the control instruction according to an opening signal of the door. When used together with the sensor to control an action of the camera device, the controller and the sensor may be installed on the same side cover, thereby reducing wiring length and difficulty.

Optionally, the controller includes a first printed circuit board and a second printed circuit board, where one of the first printed circuit board and the second printed circuit board is configured to control the camera device according to an opening degree of the door, and the other one is configured to transmit an image and a video captured by the camera device to the remote server.

Optionally, the first printed circuit board and the second printed circuit board are inserted into each other.

Optionally, the door is a hinged door, and the camera device is installed at one side of the door which is away from a rotating shaft.

Optionally, the refrigerator further includes a user interface unit, where the user interface unit includes: at least one of an input unit or an output unit, the input unit being configured to receive a user input, the output unit being configured to output information to a user, and the controller being fixed to the cover member and being electrically connected to the input unit and the output unit.

Other features which are considered as characteristic for the invention are set forth in the appended claims.

Although the invention is illustrated and described herein as embodied in a refrigerator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

In order to make the aforementioned objectives, features, and advantages of the present invention more comprehensible, specific embodiments of the present invention are described in detail with reference to the accompanying drawings.

Figure 1:
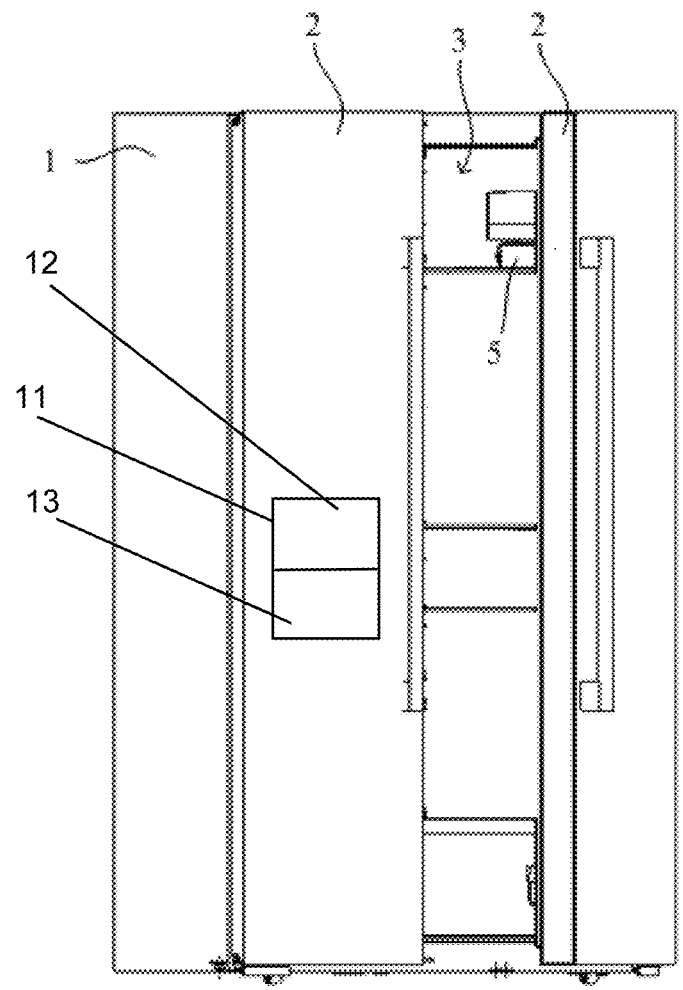
FIG. 1 is a diagrammatic, front-elevational view of a refrigerator according to an embodiment of the present invention.
Figure 2:
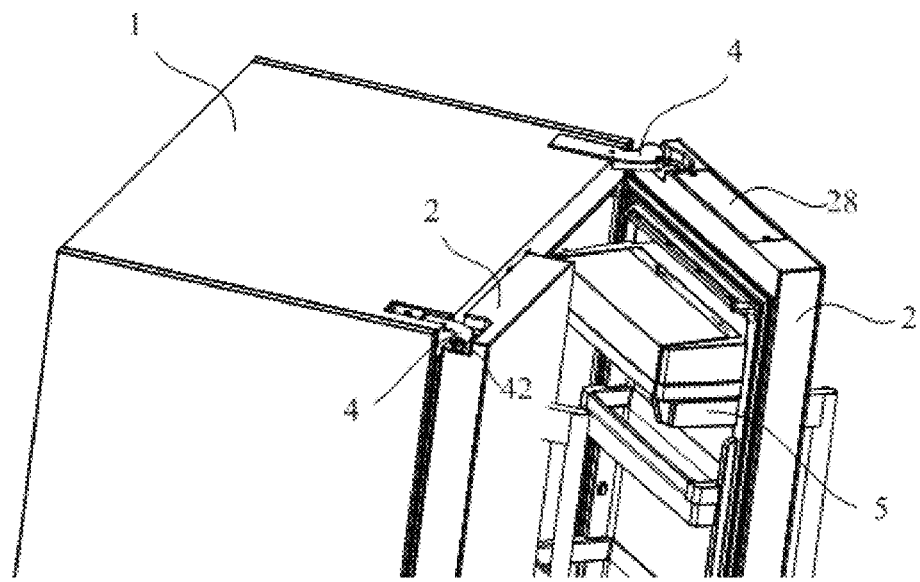
FIG. 2 is a fragmentary, perspective view of a refrigerator with a door opened according to an embodiment of the present invention.

Referring now to the figures of the drawings in detail and first, particularly, to FIGS. 1 and 2 thereof, there is seen an embodiment of a refrigerator of the present invention which includes a cabinet 1, a door 2 and a storage chamber 3 provided within the cabinet 1, in which the door 2 is configured to open or close the storage chamber 3. The door 2 is connected, at a side along a width direction of the refrigerator, to the cabinet 1 by using a hinge portion 4, and may rotate with respect to the cabinet 1, so as to complete an action of opening or closing.

The number of doors of the refrigerator is not limited in this embodiment, and a storage chamber may be closed by one or more doors. The refrigerator shown in FIG. 1 and FIG. 2 is a side-by-side refrigerator, and the same storage chamber may be closed by two doors.

As shown in FIG. 1 and FIG. 2, the refrigerator is also provided with a camera device 5 which is configured to shoot a food storage condition within the storage chamber 3.

Figure 3:
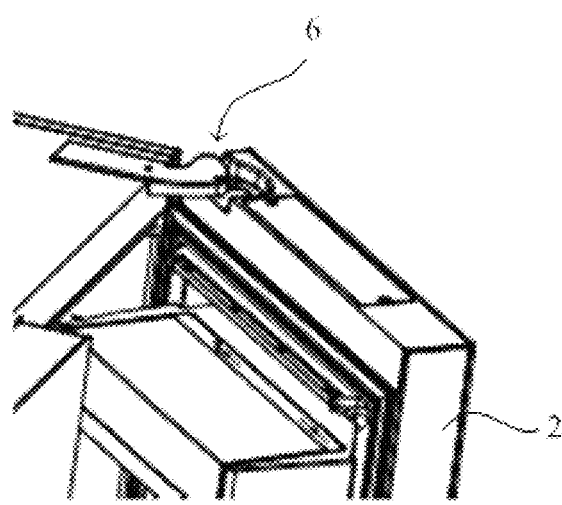
FIG. 3 is an enlarged, fragmentary, perspective view of a hinge portion of the refrigerator of FIG. 2 according to an embodiment of the present invention.
Figure 4:
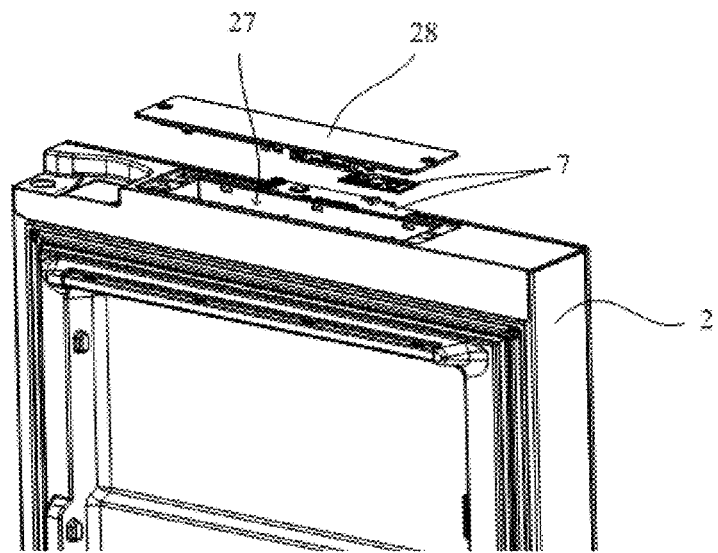
FIG. 4 is a fragmentary, exploded, perspective view of a door of a refrigerator at a position of a controller according to an embodiment of the present invention.

With reference to FIG. 3 and FIG. 4, the refrigerator is further provided with a sensor 6 and a controller 7 which are configured to cooperate with the camera device 5. The sensor 6 is configured to detect an opening degree of the door 2; the controller 7 is configured to send a control instruction according to an opening signal of the door 2 which is detected by the sensor 6; and the camera device 5 performs an image capturing action according to the control instruction of the controller 7.

The sensor 6 and the controller 7 may communicate in a wired or wireless manner, and the controller 7 and the camera device 5 may also communicate in a wired or wireless manner, so as to implement data or signal transmission. Fixed structures of the sensor 6, the controller 7, and the camera device 5 are introduced below.

(I) The Fixed Structure of the Sensor 6

Figure 5:
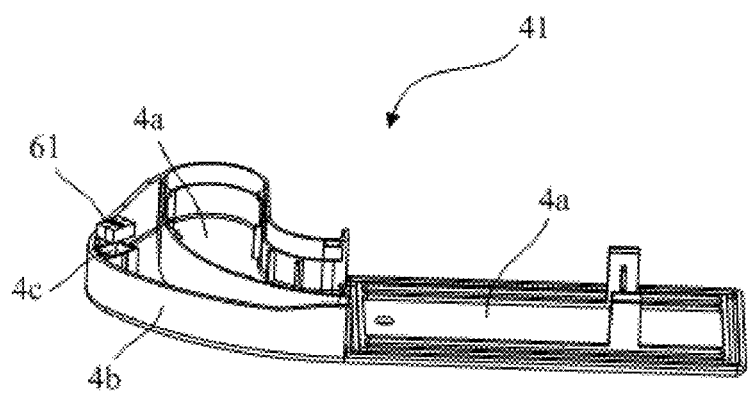
FIG. 5 is a perspective view of a hinge cover of a refrigerator according to an embodiment of the present invention.
Figure 6:
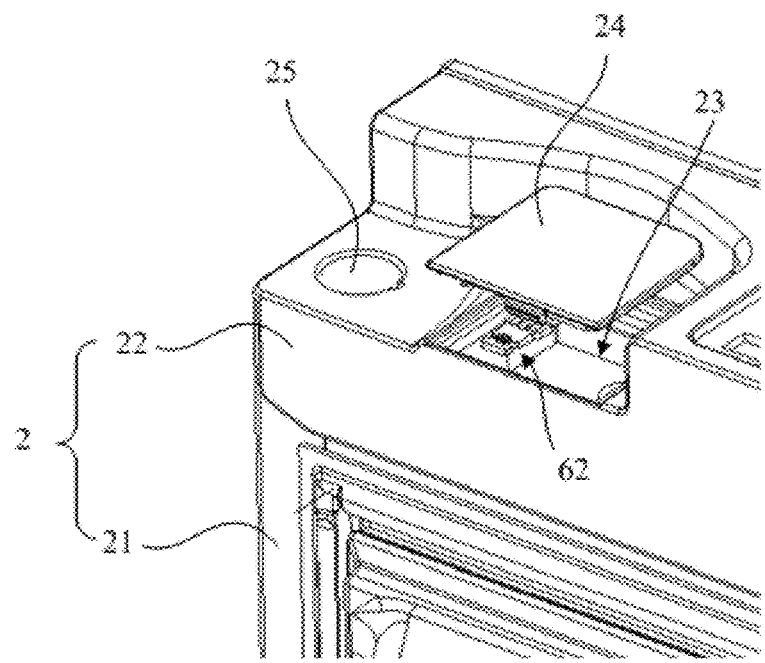
FIG. 6 is a fragmentary, perspective view of a door of a refrigerator at a position of a recess according to an embodiment of the present invention.
Figure 7:
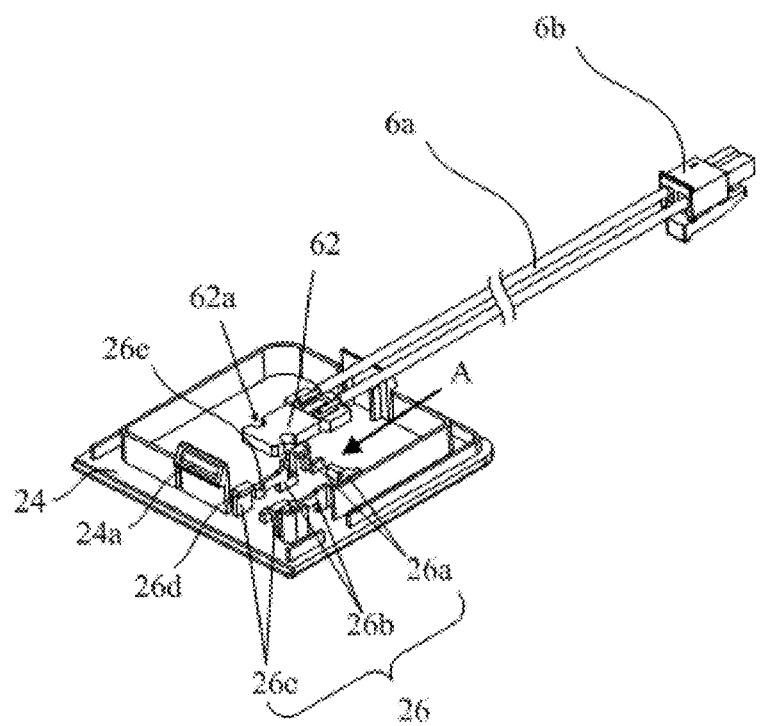
FIG. 7 is an exploded, perspective view of a first cover member and a second component of a refrigerator according to an embodiment of the present invention.

With reference to FIG. 5, FIG. 6, and FIG. 7, the sensor 6 includes: a first component 61 (FIG. 5 and FIG. 7) and a second component 62 (FIG. 6), where one of the first component 61 and the second component 62 is a magnetic component, and the other one is a magnetic sensing component. The magnetic sensing component is configured to sense a magnetic field of the magnetic component, and determine a rotational angle of the door 2 according to a change of a sensed magnetic field, so as to obtain an opening position of the door 2, and generate the opening signal.

The first component 61 is provided at the hinge portion 4, and the second component 62 is provided at the door 2. In this embodiment, the first component 61 is a magnetic component, such as a magnet; and the second component 62 is a magnetic sensing component, such as a magnetic sensor, thereby facilitating wiring.

In view of the above, in this embodiment, the sensor is provided at a position of the hinge portion 4 of the door 2, the first component 61 of the sensor is provided within the hinge portion 4, and the second component 62 is provided within the door 2. Such a configuration has the following advantages. In one aspect, a distance between the magnetic component and the magnetic sensing component is close, and the magnetic sensing component may accurately sense the magnetic field of the magnetic component, thereby preventing a failed sensing because the distance between the magnetic component and the magnetic sensing component is too large, and ensuring reliability of work of the sensor. In another aspect, the first component 61 is provided at the hinge portion 4. However, when provided on the non-cabinet 1, with respect to the cabinet 1, installation and fixing of the first component 61 need not be considered, thereby simplifying a structure of the cabinet 1.

In other embodiments, if a wiring solution allows, or a wireless communication manner is used between the magnetic sensing component and the controller 7, the first component 61 may also be provided as a magnetic sensing component, and the second component 62 is provided as a magnetic component.

Specifically, with reference to FIG. 2 and FIG. 5, the hinge portion 4 includes a hinge cover 41 fixed to the cabinet 1, and a rotating shaft 42 fixed to the door 2 (FIG. 2), where one end of the hinge cover 41 is fixed on the cabinet 1, and the other end is fixed on the rotating shaft 42. The first component 61 is provided on the hinge cover 41, and is located at an end of the hinge cover 41 which is away from the cabinet 1, i.e., located at an end close to the rotating shaft 42, so as to be close to the door 2, thereby being close to the second component 62.

As shown in FIG. 5, the hinge cover 41 includes: a base wall 4a substantially parallel to a top surface of the door 2, and a flange 4b connected to the base wall 4a, where the first component 61 is fixed to the hinge cover 41 along the flange 4b. The top surface of the door 2 refers to a surface parallel to an upper surface of the refrigerator.

Specifically, the hinge cover 41 further includes an installation groove 4c provided along the flange 4b, where the first component 61 is fixed in the installation groove 4c. In this embodiment, the installation groove 4c uses the base wall 4a as a bottom wall, and the flange 4b serves as a part of a side wall of the installation groove 4c. In other embodiments, the installation groove 4c may also be provided independently from the base wall 4a and the flange 4b.

In some embodiments, the first component 61 may be engaged in the installation groove 4c by using an engagement portion, may also be pressed in the installation groove 4c through an interference fit, or is fixed in the installation groove 4c through another manner or fixed structure.

In this embodiment, the first component 61 and the hinge cover 41 are co-injection-molded. That is, during an injection molding process of the hinge cover 41, the first component 61 is placed in an injection mold to be injected. After the injection is completed, the first component 61 may be firmly fixed in the hinge cover 41.

Problems with regard to fixing the first component 61 in the hinge cover 41 may be well resolved in a co-injection-molding manner, and the fixing is reliable, without needing an additional installation, thereby saving a process and cost.

The second component 62 is provided on the door 2. Theoretically, a sensing distance allows the second component 62 to be provided at any position of the door 2. In this embodiment, the second component 62 is provided at a side of the door 2 which faces the hinge cover 41, and the hinge cover 41 is not provided with the first component 61. Moreover, the second component 62 serving as the magnetic sensing component is located at an end of the door 2 which is close to the rotating shaft 42. In this way, the magnetic component and the magnetic sensing component are adjacent.

Specifically, as shown in FIG. 6, the door 2 includes a door sheet body 21 and a side cover 22, where the side cover 22 is located at an end of the door 2 which is at a height direction, and is connected to the door sheet body 21. At the height direction, the side cover 22 may be located at a top portion or a bottom portion of the door 2. The height direction herein refers to a height direction of the refrigerator.

As stated above, the second component 62 is provided at a side of the door 2 which faces the hinge cover 41. If the first component 61 is provided in the hinge cover 41 located at the top portion of the door 2, the second component 62 may be provided in the side cover 22 located at the top portion of the door 2. If the first component 61 is provided in the hinge cover 41 located at the bottom portion of the door 2, the second component 62 may be provided in the side cover 22 located at the bottom portion of the door 2. In this embodiment, both the first component 61 and the second component 62 are located at the top portion of the door 2.

As shown in FIG. 6, which shows the side cover 22 provided with the second component 62, the top portion of the side cover 22 is provided with a recess 23, and a cover member which is defined as a first cover member 24, where the first cover member 24 is configured to close the recess 23. The side cover 22 is provided with a hinge hole 25 for the rotating shaft 42 to pass through, and the recess 23 is provided at an end of the door 2 which is close to the hinge hole 25, thereby being adjacent the hinge hole 25.

The second component 62 is located in the recess 23 and is fixed in the recess 23. For example, it may be fixed on a side wall or a bottom wall of the recess 23. In this embodiment, as shown in FIG. 7, the second component 62 is fixed to the first cover member 24. When assembling, the second component 62 is first fixed to the first cover member 24, and then the first cover member 24 covers the recess 23. The operation is simple and convenient.

Specifically, an inner side of the first cover member 24 (a side facing the recess 23) is provided with a positioning portion which is defined as a first positioning portion 26. The second component 62 is fixed by using the first positioning portion 26. This embodiment does not limit a structure of the first positioning portion 26, as long as the second component 62 may be fixed on the first cover member 24, where a detachable fixing manner such as engagement or a non-detachable fixing manner may be used.

With reference to FIG. 7, the first positioning portion 26 is fixed to an inner surface of the first cover member 24 which faces the recess 23, and there are two sets of first positioning portions 26 which are respectively located at two sides of the second component 62. A channel for the second component 62 to pass through is formed between the first positioning portions 26 at the two sides. The second component 62 passes through a passage along a direction parallel to the inner surface of the first cover member 24, and is fixed in the first positioning portion 26. A penetration direction is as shown by direction A of FIG. 7. As is seen along the penetration direction A of the second component 62, the first positioning portion 26 includes a first positioning block 26a, a second positioning block 26b, and a third positioning block 26c which are successively disposed.

At least the first positioning block 26a and the third positioning block 26c are provided with a first locking protruding portion 26d at a free end, configured to abut against a side of the second component 62 which faces away from the first cover member 24, so as to lock the second component 62 at a depth direction of the recess 23, i.e., the height direction of the door.

The second positioning block 26b is connected with an elastic strip at a front end along the penetration direction A of the second component 62, where the elastic strip is also provided with a second locking protruding portion 26e. The second locking protruding portion 26e is configured to lock the second component 62 at two sides in the penetration direction A. Specifically, the second component 62 includes a side surface located at the two sides along the penetration direction A, where the side surface is provided with a recess portion 62a corresponding to the second locking protruding portion 26e. After the assembly is completed, the second locking protruding portion 26e on the second positioning block 26b is engaged in the recess portion 62a.

In some other embodiments, positions of the first locking protruding portion 26d and the second locking protruding portion 26e are not limited, and the first locking protruding portion 26d and the second locking protruding portion 26e may be located at any one or more of the first positioning block 26a, the second positioning block 26b, and the third positioning block 26c. In addition, the number of the positioning blocks in the first positioning portion 26 may also be adjusted, for example, the number may be one, two, or another number.

With reference to FIG. 7 again, along the penetration direction A, the width of a back half part of the second component 62 is greater than the width of a front half part, where a shaft shoulder is formed between the two parts, and the first positioning block 26a abuts against the shaft shoulder, so as to lock the second component 62 along the direction A for passing though, thereby preventing the second component 62 from passing outward.

The second component 62 may be separated from the inner surface of the first cover member 24 by using a spacer.

In addition, in order to implement the fixing between the first cover member 24 and the recess 23, one of the first cover member 24 and the recess 23 is provided with a buckle, and the other one is provided with a hook cooperating with the buckle, where the buckle is engaged in the hook. In this embodiment, as shown in FIG. 7, the first cover member 24 is provided with a hook 24a at the inner surface (only a part is marked in the figure), and the buckle is provided in the recess 23.

As shown in FIG. 7, in this embodiment, the second component 62 and the controller 7 are connected by using a cable 6a, where the cable 6a is connected with a connector 6b at an end facing away from the second component 62, and is connected to the controller 7 by using the connector 6b.

(II) The Fixed Structure of the Controller 7

Theoretically, the controller 7 may be fixed to any position of the cabinet 1 or the door 2. In this embodiment, the controller 7 is fixed on the door 2, and is located on the side cover 22 of the door 2, for example, on a side cover at the top portion of the door or a side cover at the bottom portion of the door.

Preferably, the controller 7 and the second component 62 of the sensor 6 are located on the same side cover 22, thereby facilitating the wiring, and reducing a communication transmission distance.

As shown in FIG. 4, the side cover is provided with an installation hole 27 facing away from an opening at a side of the door sheet body 21, and a cover member configured to close the opening, where the cover member is defined as a second cover member 28, and the controller 7 is located in the installation hole 27.

The controller 7 may be fixed in the installation hole 27, for example, it may be fixed on an inner wall of the installation hole 27, or the controller 7 may also be fixed to an inner side of the second cover member 28. In this embodiment, the fixing of the controller 7 uses the latter manner. That is, the controller 7 is fixed to the inner side of the second cover member 28. When assembling, the controller 7 is first fixed to the second cover member 28, and then the second cover member 28 covers the installation hole 27. The operation is simple and convenient.

An outer side of the second cover member 28 forms a part of an outer surface of the door 2. As shown in FIG. 2, the second cover member 28 is flush with a surface of the top portion of the door 2.

Figure 8:
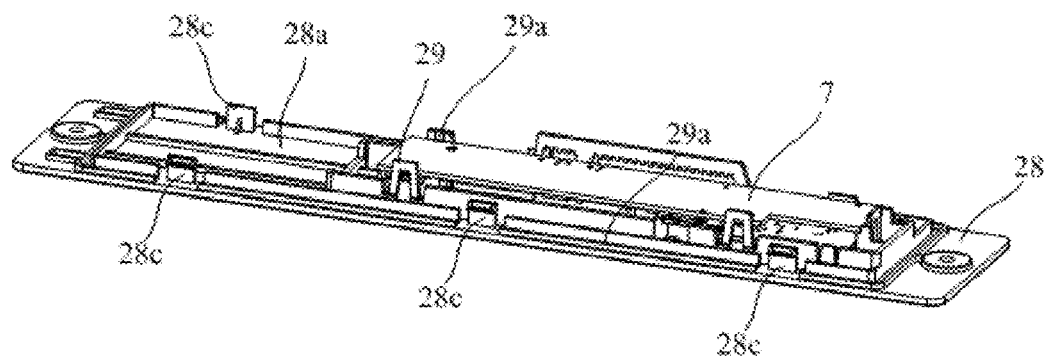
FIG. 8 is a perspective view of a second cover member and a controller of a refrigerator according to an embodiment of the present invention.
Figure 9:
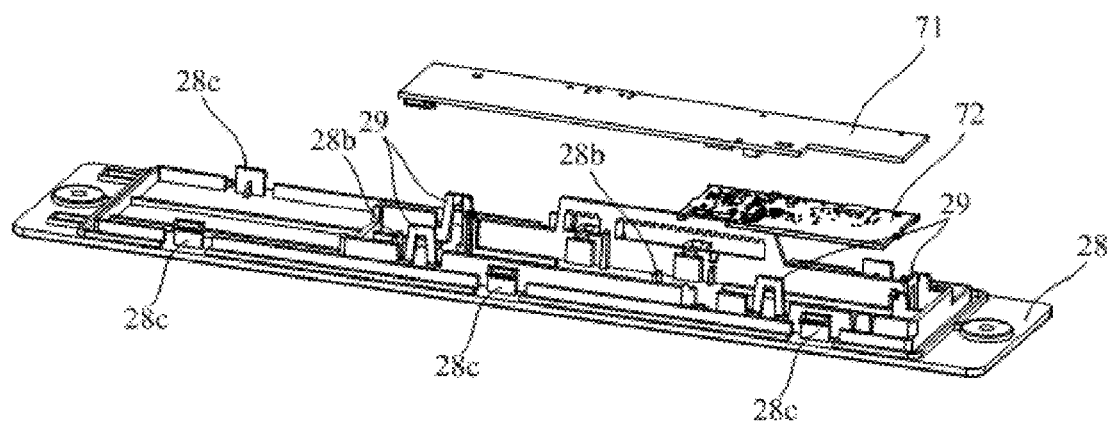
FIG. 9 is an exploded, perspective view of a second cover member and a controller of a refrigerator according to an embodiment of the present invention.

Further, as shown in FIG. 8 and FIG. 9, the inner side of the second cover member 28 is provided with a positioning portion which is defined as a second positioning portion 29, where the controller 7 is fixed to the second cover member 28 by using the second positioning portion 29. This embodiment does not limit a structure of the second positioning portion 29, as long as the controller 7 may be fixed on the second cover member 28, where a detachable fixing manner such as engagement or a non-detachable fixing manner may be used.

It can be seen from FIG. 8 and FIG. 9 that the controller 7 is plate-shaped, and a plate surface thereof is parallel to the second cover member 28. It should be understood that the controller 7 may also not be limited to a plate shape.

As shown in FIG. 8 and FIG. 9, the second cover member 28 includes an inner surface 28a facing the installation hole 27, and one end of the second positioning portion 29 is fixed to the inner surface 28a, and extends towards the controller 7. A free end of the second positioning portion 29 is provided with a hook 29a, so as to be hooked at a side of the controller 7 which faces away from the inner surface 28a.

There is a plurality of second positioning portions 29 which are located at two sides of the controller 7 which are respectively along a width direction of the door 2.

The second positioning portions 29 may be elastic pieces. As seen along the width direction of the door 2, a distance from the second positioning portion 29 located at a side of the controller 7 to the second positioning portion 29 located at another side of the controller 7 is smaller than width of a corresponding position of the controller 7. When installing, the controller 7 is pressed in along a direction vertical to the inner surface 28a, so as to force the second positioning portion 29 to generate an elastic deformation outwards. After the controller 7 is totally pressed in, the hook 29a is hooked on the controller 7.

In addition, an end portion of the controller 7 which is along the width direction may also be provided with the second positioning portion 29, so as to lock the controller 7 at the end portion.

In this embodiment, a spacer 28b is provided between the inner surface 28a and the controller 7. FIG. 9 only shows a part of the spacer 28b, and a side of the controller 7 which faces the inner surface 28a abuts against the spacer 28b. The spacer 28b provides a gap between the controller 7 and the inner surface 28a.

In addition, in order to implement the fixing between the second cover member 28 and the installation hole 27, one of the second cover member 28 and the installation hole 27 is provided with a buckle, and the other one is provided with a hook cooperating with the buckle, where the buckle is engaged in the hook. In this embodiment, as shown in FIG. 8 and FIG. 9, the second cover member 28 is provided with a hook 28c at the inner surface 28a (only a part is marked in the figure), and the buckle is provided in the installation hole 27.

A person skilled in the art knows that the door sheet body 21 includes a front door sheet and a rear door sheet, where a foaming material foamed by a foaming liquid is filled between the front door sheet and the rear door sheet. The controller 7 and the foaming material need not be separated, so as to prevent the foaming liquid from immersing the controller 7 during a foaming process.

Therefore, in some embodiments, the installation hole 27 is provided to be a blind hole. That is, in a height direction, the installation hole 27 is provided with an opening only at a side facing away from the door sheet body 21, and is closed at the other side.

As is seen along a front-back direction of the refrigerator, the installation hole 27 is staggered from the storage chamber 3. The storage chamber 3 herein mainly refers to a storage chamber corresponding to a door provided with the installation hole 27. In this embodiment, the installation hole 27 is located in the side cover 22 at an upper portion of the door, and extends along the height direction of the refrigerator. In this way, a bottom portion of the installation hole 27 needs to be located above the corresponding storage chamber.

In order to ensure installation of a controller 7, the depth of the installation hole 27 should be slightly greater than thickness of the controller 7. On this basis, the depth of the installation hole 27 should be as small as possible, so as to prevent the installation hole 27 and the storage chamber 3 from overlapping along the front-back direction of the refrigerator. If the bottom portion of the installation hole 27 is lower than an edge of the storage chamber 3, and the installation hole 27 and the storage chamber 3 overlap along the front-back direction of the refrigerator, the thickness of an isolation material of the door at a position of the installation hole 27 is small and the isolation effect is weak. As a result, a dewing phenomenon occurs to a portion of the door at the installation hole 27, thereby affecting cooling effects of the refrigerator.

The installation hole 27 and the recess 23 are in communication to allow the cable 6a to pass through, where the cable 6a is configured to electrically connect the controller 7 and the magnetic sensing component. As shown in FIG. 9, the controller 7 includes a first printed circuit board 71 and a second printed circuit board 72.

One of the first printed circuit board 71 and the second printed circuit board 72 is configured to receive the opening signal of the door 2 so as to control the camera device 5, and the other one is configured to transmit the image/video captured by the camera device 5 to the remote server. The remote server may be a cloud end or terminal, or a user terminal communication device such as a telephone or a tablet computer.

In this embodiment, the first printed circuit board 71 and the second printed circuit board 72 are inserted into each other by using a connector (not shown in the figure), so as to achieve a communication connection. In order to save space, the first printed circuit board 71 and the second printed circuit board 72 are overlapped.

As shown in FIG. 9, the second printed circuit board 72 is located between the first printed circuit board 71 and the second cover member 28, and a volume of the first printed circuit board 71 is greater than the second printed circuit board 72. The first printed circuit board 71 is provided with a power source for supplying power to power-consuming components on the camera device 5, the second component 62, and the controller 7.

Meanwhile, the controller 7 communicates with the camera device 5 by using the first printed circuit board 71, and communicates with the second component 62 in the sensor by using the second printed circuit board 72.

Specifically, the second printed circuit board 72 receives the opening signal of the door 2 which is detected by the sensor 6, and sends a control instruction to the camera device 5 according to the opening signal; and the camera device 5 performs an image capturing action according to the control instruction.

After the camera device 5 finishes the shooting, a captured image or video may be sent. The first printed circuit board 71 is configured to receive the image or video sent by the camera device, and then send the received image and a composite video to the remote server.

A wireless communication module (not shown in the figure) is provided at the controller 7, and the wireless communication module is configured to communicate with the remote server.

In other embodiments, functions of the first printed circuit board 71 and the second printed circuit board 72 may be exchanged. That is, the communication with the camera device 5 may be implemented by using the second printed circuit board 72, and the communication with the second component 62 in the sensor may be implemented by using the first printed circuit board 71.

(III) The Fixed Structure of the Camera Device

Figure 10:
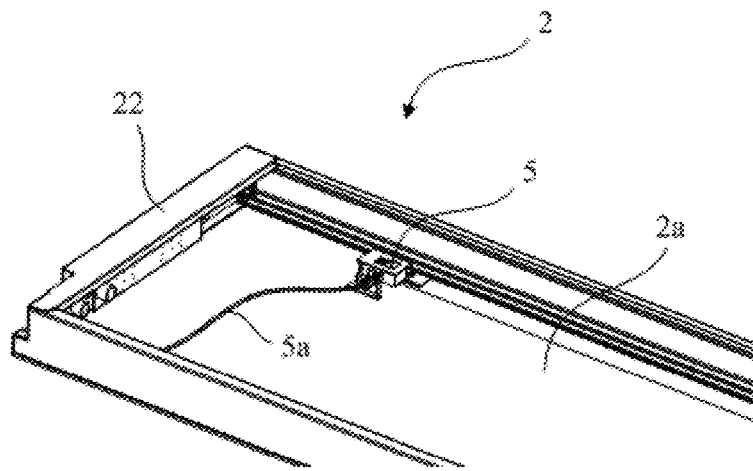
FIG. 10 is a perspective view of a camera device of a refrigerator installed on a door according to an embodiment of the present invention.

With reference to FIG. 1 and FIG. 2 again and in combination with FIG. 10, it is seen that the camera device 5 is fixed to the door 2, and the controller 7 is electrically connected to the camera device 5 by using a cable 5a.

As stated above, the camera device 5 is configured to receive the control instruction of the controller 7, and perform an image capturing action according to the control instruction. The camera device 5 is provided with an output module, configured to output a captured image to the controller 7.

Figure 11:
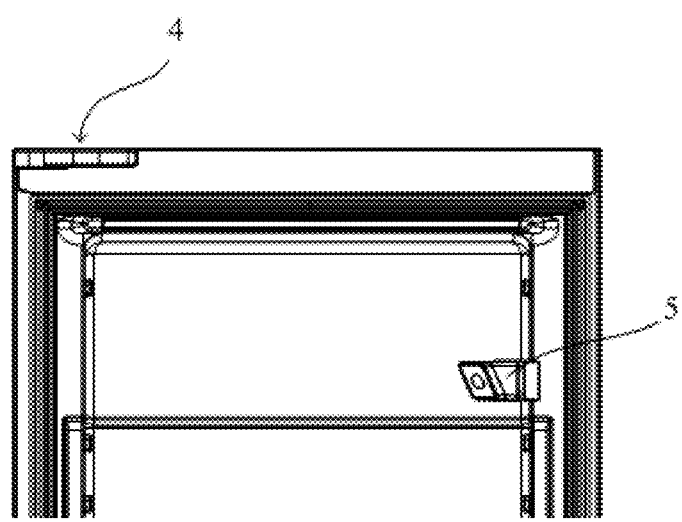
FIG. 11 is a fragmentary, front-elevational view of a camera device of a refrigerator installed on a door according to an embodiment of the present invention.

As stated above, the door 2 is a hinged door 2. In order to have a better shooting angle, as shown in FIG. 11, in this embodiment, the camera device 5 is installed at side of the door 2 which faces away from the hinge portion 4, and is located at an upper half of the door 2.

While being used, the sensor 6 detects an opening degree of the door 2. When the detected opening degree of the door 2 is substantially 45 degrees, the controller 7 sends a control signal to the camera device 5, so as to control the camera device 5 to perform the shooting action. At this time, an entire space of the storage chamber 3 may basically fall within an image capturing field of view of the camera device 5, so as to implement shooting of the camera device 5 for the food storage condition within the entire storage chamber 3.

Figure 12:
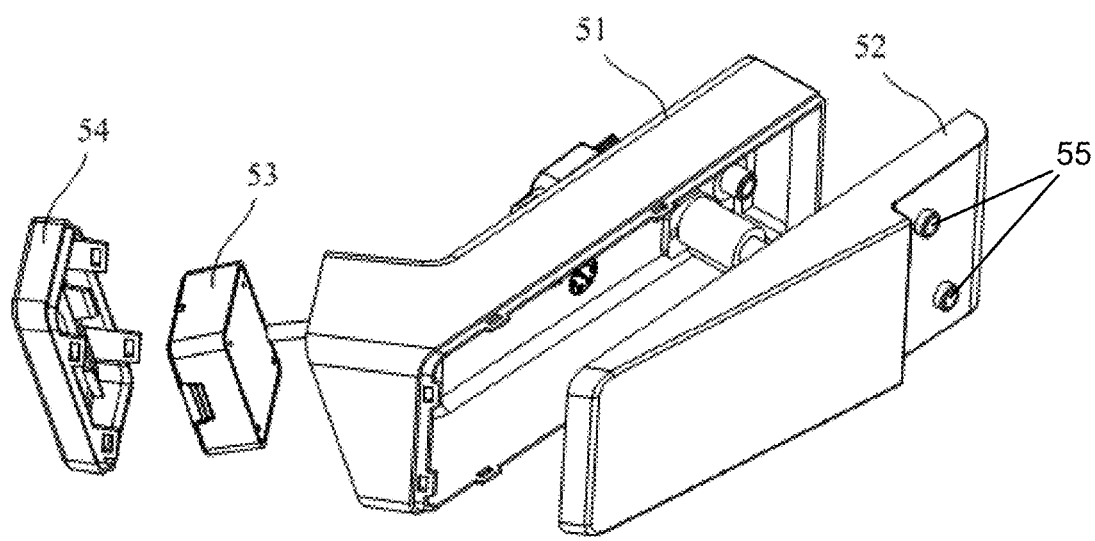
FIG. 12 is an exploded, perspective view of a camera device of a refrigerator according to an embodiment of the present invention.

As shown in FIG. 12, the camera device 5 includes a first housing 51 and a second housing 52, where the first housing 51 and the second housing 52 enclose and form an accommodation chamber for accommodating a camera 53. The accommodation chamber is provided with an opening at an end, and a lens of the camera 53 faces the opening. The opening is closed by using a transparent lens cap 54. A cable connected to the camera 53 passes out from the accommodation chamber, and then is connected to the controller 7.

The first housing 51 and the second housing 52 are provided at an end far away from the lens cap 54 with fixing holes 55 for a fixing bolt (not shown in the figure) to pass through. The camera device 5 is fixed on the door 2 by using the fixing bolt.

It should be noted that in this embodiment, the sensor 6 may be configured to be connected to another device, so as to transmit an opening signal of the door thereto. The controller 7 may also be configured to be connected to another device, such as a control panel, so as to control the same to work.

In the foregoing embodiments, the controller 7 is connected to the camera device. In another embodiment of the present invention, the controller 7 may also be connected to another device, and this device may be a user interface unit 11 or another display device. For example, the refrigerator may be further provided with the user interface unit 11 which includes: at least one of an input unit 12 or an output unit 13. The input unit 12 is configured to receive user input, and the output unit 13 is configured to output information to a user. The controller 7 is electrically connected to the input unit 12 and the output unit 13, so as to process input information of the user and control the output information of the output unit 13.

Although the present invention includes the embodiments disclosed above, the present invention is not limited thereto. Any person skilled in the art may make various variations and modifications without departing from the scope and spirit of the present invention. Therefore, the protection scope of the present invention should fall within the scope defined by the claims.

The invention claimed is:

1. A refrigerator, comprising:
a cabinet; and
a door connected to said cabinet, said door including:
a door sheet body having an end portion;
a side cover connected to said end portion of said door sheet body, said side cover having an installation hole and a cover member configured to close said installation hole; and
a controller fixed to said side cover and located in said installation hole;
a sensor fixed to said side cover and configured for detecting an opening angle of said door, said sensor being electrically connected to said controller; and
said controller being configured for generating a control instruction according to a signal about the opening angle of said door.

2. The refrigerator according to claim 1, wherein said cover member has an inner side, and said controller is fixed to said inner side.

3. The refrigerator according to claim 1, wherein said installation hole is a blind hole.

4. The refrigerator according to claim 3, wherein said cabinet and said door delimit a storage chamber, and said installation hole is staggered from said storage chamber along a front-back direction of the refrigerator.

5. The refrigerator according to claim 1, wherein said door has an outer surface, and said cover member has an outer side forming a part of said outer surface of said door.

6. The refrigerator according to claim 1, which further comprises:
a camera device fixed to said door and electrically connected to said controller;
said camera device being configured to receive a control instruction of said controller and to perform an image capturing action according to the control instruction.

7. The refrigerator according to claim 6, wherein said camera device has an output module configured to output a captured image to said controller.

8. The refrigerator according to claim 1, wherein said controller has a wireless communication module configured to communicate with a remote server.

9. The refrigerator according to claim 1, which further comprises a user interface unit including an input unit and an output unit, said input unit being configured to receive a user input, said output unit being configured to output information to a user, and said controller being fixed to said cover member and electrically connected to said input unit and said output unit.

10. The refrigerator according to claim 1, wherein said door has a hinge portion, said sensor having a first sensor component and a second sensor component, said first sensor component being disposed in said hinge portion and said second sensor component being disposed in said door adjacent said hinge portion.

11. The refrigerator according to claim 10, wherein said hinge portion includes a hinge cover fixed to said cabinet, said door has a rotating shaft affixed thereto, said first sensor component being disposed on said hinge cover at a position away from said cabinet.

12. The refrigerator according to claim 11, wherein said hinge cover includes a base wall and a flange said first sensor component being fixed to the hinge cover along said flange.

13. The refrigerator according to claim 12, wherein said hinge cover includes an installation groove along said flange, said first sensor component being disposed in said groove.

14. A refrigerator, comprising:
a cabinet; and
a door connected to said cabinet, said door including:
a door sheet body having an end portion;
a side cover connected to said end portion of said door sheet body, said side cover having an installation hole and a cover member configured to close said installation hole;
a controller fixed to said side cover and located in said installation hole;
said cover member having an inner side provided with a positioning portion, said positioning portion fixing said controller to said cover member;
said cover member being plate-shaped, and said controller being plate-shaped and parallel to said cover member.

15. A refrigerator, comprising:
a cabinet; and
a door connected to said cabinet, said door including:
a door sheet body having an end portion;
a side cover connected to said end portion of said door sheet body, said side cover having an installation hole and a cover member configured to close said installation hole;
a controller fixed to said side cover and located in said installation hole;
a camera device configured for capturing images and video;
said controller including a first printed circuit board and a second printed circuit board, one of said printed circuit boards being configured to control said camera device according to an opening degree of said door, and the other of said printed circuit boards being configured for transmitting an image and a video captured by said camera device to a remote server.

16. The refrigerator according to claim 15, wherein said first printed circuit board and said second printed circuit board are connected to each other.

17. The refrigerator according to claim 6, which further comprises a rotating shaft, said door being hinged on said rotating shaft, and said camera device being installed at a side of said door remote from said rotating shaft.

18. The refrigerator according to claim 15, which further comprises a rotating shaft, said door being hinged on said rotating shaft, and said camera device being installed at a side of said door remote from said rotating shaft.

* * * * *